US009095988B2

(12) United States Patent
Finck

(10) Patent No.: US 9,095,988 B2
(45) Date of Patent: Aug. 4, 2015

(54) WIRE HANDLING FOR VEHICLE GLAZING PANEL CUT OUT

(75) Inventor: William Finck, Brentwood (GB)

(73) Assignee: BELRON HUNGARY KFT-ZUG BRANCH, Zug (CH)

(*) Notice: Subject to any disclaimer, the term of this patent is extended or adjusted under 35 U.S.C. 154(b) by 0 days.

(21) Appl. No.: 13/579,064

(22) PCT Filed: Feb. 16, 2011

(86) PCT No.: PCT/GB2011/050299
§ 371 (c)(1), (2), (4) Date: Oct. 22, 2012

(87) PCT Pub. No.: WO2011/101667
PCT Pub. Date: Aug. 25, 2011

(65) Prior Publication Data

US 2013/0037648 A1 Feb. 14, 2013

(30) Foreign Application Priority Data

Feb. 19, 2010 (GB) .................................. 1002856.1

(51) Int. Cl.
*B32B 38/10* (2006.01)
*B26D 1/547* (2006.01)
*B65H 75/34* (2006.01)
*B26D 7/00* (2006.01)

(52) U.S. Cl.
CPC ................ *B26D 1/547* (2013.01); *B65H 75/34* (2013.01); *B26D 7/00* (2013.01); *B65H 2701/354* (2013.01); *Y10T 156/1184* (2015.01); *Y10T 156/1967* (2015.01)

(58) Field of Classification Search
CPC ........... B26D 2001/0081; B26D 1/547; B26D 7/018; B26D 7/26; B65H 41/00
See application file for complete search history.

(56) References Cited

U.S. PATENT DOCUMENTS

| | | | | |
|---|---|---|---|---|
| 3,952,965 | A | 4/1976 | Falcon | |
| 4,316,866 | A | 2/1982 | Martin | |
| 4,787,168 | A | 11/1988 | Benit | |
| 5,657,935 | A * | 8/1997 | Cooper | 242/128 |
| 6,616,800 | B2 | 9/2003 | Eriksson | |
| 8,307,873 | B2 * | 11/2012 | Klabunde et al. | 156/762 |
| 2006/0117573 | A1 * | 6/2006 | Jensen et al. | 30/286 |
| 2008/0012349 | A1 | 1/2008 | Finck | |
| 2008/0017295 | A1 * | 1/2008 | Finck | 156/108 |
| 2009/0283214 | A1 * | 11/2009 | Nelson | 156/344 |
| 2010/0132882 | A1 * | 6/2010 | Hess et al. | 156/250 |
| 2010/0139471 | A1 * | 6/2010 | Finck | 83/743 |

FOREIGN PATENT DOCUMENTS

| | | |
|---|---|---|
| CA | 2034221 | 1/1991 |
| DE | 4012207 | 10/1991 |
| DE | 29711291 | 9/1997 |

(Continued)

*Primary Examiner* — Philip Tucker
*Assistant Examiner* — Nickolas Harm
(74) *Attorney, Agent, or Firm* — Gordon & Jacobson, PC

(57) ABSTRACT

A dispensing system for dispensing cutting wire to be used in a glazing panel cut out procedure has a mounting device with a docking station for docking a wire store device. The wire store device mounts on the docking station in order to dispense the wire. The mounting device can have a rotary means operable to pay out cutting wire from the system. The rotary means is controllable to adjust the applied torque required to operate the rotary means.

19 Claims, 13 Drawing Sheets

(56) References Cited

FOREIGN PATENT DOCUMENTS

| | | |
|---|---|---|
| EP | 0093283 | 11/1983 |
| EP | 2191944 | 6/2010 |
| GB | 2465847 | 6/2010 |
| WO | WO8607017 | 12/1986 |
| WO | WO9858779 | 12/1998 |
| WO | WO2004103748 | 12/2004 |
| WO | WO2006030212 | 3/2006 |

* cited by examiner

WIRE HANDLING FOR VEHICLE GLAZING PANEL CUT OUT

CROSS-REFERENCE TO RELATED APPLICATIONS

This application claims priority from PCT/GB/2011/050299 filed on Feb. 16, 2011 and from GB 1002856.1, filed Feb. 19, 2010, which are hereby incorporated by reference in their entireties.

BACKGROUND OF THE INVENTION

1. Field of the Invention

The present invention relates to wire handling for vehicle glazing panel cut out techniques.

2. State of the Art

Vehicle glazing panels such as vehicle windscreens (windshields) are typically bonded in supporting frames by adhesive bonding material such as polyurethane, applied in a continuous bead about the periphery of the glazing panel and frame.

Wire cutting techniques have been previously proposed and used to effect glazing panel removal (for replacement or otherwise). Exemplary techniques are disclosed in, for example, EP-A-0093283, Canadian Patent Specification 2034221, U.S. Pat. No. 6,616,800, German Patent 4012207 and PCT Publications WO2006/030212, WO86/07017 and WO98/58779.

SUMMARY OF THE INVENTION

An improved technique and apparatus has now been devised which aids in cutting out a windscreen by having a dispenser unit for dispensing cutting wire the dispenser having means for mounting to the glazing panel and enabling cutting wire to be payed out from the dispenser whilst mounted to the glazing panel during the cut out procedure. A wire winder unit is typically mounted on the windscreen, the winder unit including one or more winder spools. The winder unit may be moved about the screen between several mounted positions with separate respective cuts being effected at the different mounted positions.

When the setting a wire dispenser unit is initially set on the windscreen, the cutting wire may be looped about the periphery of the glazing panel and a free end of the wire payed out from the dispenser may be connected to the winder spool of the winder unit.

Typically the winder spool of the winder unit is operated to wind the wire and thereby cut the bonding material, wherein during cutting wire is payed out from the dispenser unit in order to effect slip cutting of the bonding material.

According to a first aspect, the present invention provides a dispensing system for dispensing cutting wire to be used in a glazing panel cut out procedure, the system comprising;

- a mounting device arranged to be mounted on a glazing panel, the mounting device being provided with a docking station for docking a wire store device;
- a wire store device arranged to be mounted on the docking station in order to dispense wire; the wire store device being demountable from the docking station.

Considered alternatively the invention provides a dispensing system for dispensing cutting wire to be used in a glazing panel cut out procedure, the system comprising a mounting device arranged to be mounted on a glazing panel, the mounting device being provided with a docking station configured for demountable docking of a wire store device.

Beneficially, the docking station is provided with rotary means operable to pay out cutting wire from the wire store device.

It is preferred that the rotary means is controllable to adjust the applied torque required to operate the rotary means. Adjustable brake means may be provided for this purpose, preferably being operable to adjust the applied torque required to operate the rotary means.

In one embodiment, the adjustable brake means preferably comprises a friction brake which is tightenable to increase the braking effect, or relaxable to reduce the braking effect.

It is preferred that the rotary means comprises a rotary device to which the wire store device is arranged to be coupled in docked demountable engagement.

In a preferred embodiment, when in docked engagement a spool of the store is coupled for rotation with the rotary device.

In certain embodiments it may be preferred that the store device has a central aperture for accommodating the rotary device in docked demountable engagement.

The docking station and the wire store device may beneficially be provided with respective complementary engaging docking formations arranged to engage when the wire store is docked with the docking station.

In a preferred realization, the engaging docking formations are arranged to permit the store to be mounted and demounted from the docking station but ensure that the store and docking station are coupled for rotation together in unison when in the docked configuration.

Where adjustable brake means is utilized this may beneficially be operated by a cam and lever arrangement.

In a preferred embodiment, the mounting device for securing on the glazing panel comprises a suction mount.

According to an alternative aspect, the invention provides a dispensing system for dispensing cutting wire to be used in a glazing panel cut out procedure, the system comprising a mounting device arranged to be mounted on a glazing panel, the mounting device being provided with rotary means operable to pay out cutting wire from the system, wherein the rotary means is controllable to adjust the applied torque required to pay out the cutting wire.

In a preferred realization, the system includes adjustable brake means operable to adjust the applied torque required to operate the rotary means.

The adjustable brake means may comprises a friction brake which is tightenable to increase the braking effect or relaxable to reduce the braking effect.

The rotary means may comprise a rotary device to which a wire store device is arranged to be coupled, the system including adjustable brake means engaging with the rotary device (preferably at an interface perpendicular to the rotational axis of the rotary device) and operable to adjust the applied torque required to operate the rotary device.

According to a further alternative aspect, the invention provides a wire store device for storing cutting wire for dispensing, the store device comprising:

- an annular housing having an annular base and an arcuate upstanding outer wall extending upwardly from the base, the arcuate upstanding outer wall extending around the annular base between terminal edges of the wall such that a gap is defined in the outer wall;
- an annular spool body member received nested internally of the arcuate upstanding outer wall of the annular housing, the annular housing and annular spool body being retained relative to one another such that relative rotation between the annular housing and annular spool body is facilitated.

It is preferred that an inner cylindrical wall for the store device is provided by an inner cylindrical wall of the annular spool body.

The annular spool body member may, in a preferred embodiment, be received nested internally of the arcuate upstanding outer wall of the annular housing by means of formations (preferably snap fit engagement formations) that prevent separation of the spool body out of nested engagement with the housing but permit relative rotation between the annular housing and annular spool body.

In preferred embodiment the inner cylindrical wall of the device (preferably the inner cylindrical wall of the spool body) may be provided with formations permitting the wire store device to be rotary coupled to a rotary means operable to pay out, or draw in, cutting wire.

The invention will now be further described in a specific embodiment by way of example only and with reference to the accompanying drawings.

DETAILED DESCRIPTION OF THE PREFERRED EMBODIMENTS

Figure 1:
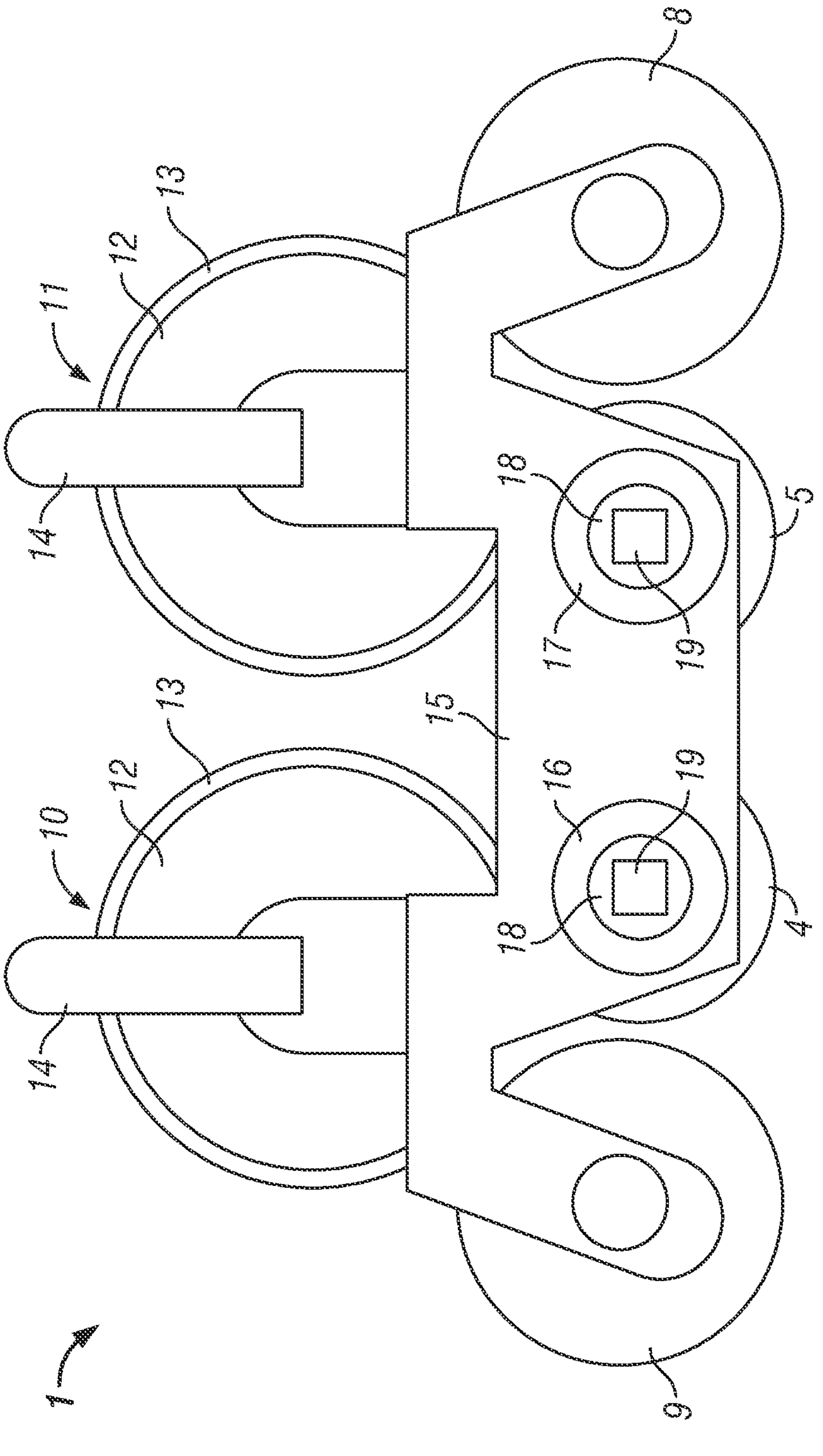
FIG. 1 is a schematic plan view of a winder unit of an exemplary cut out system in accordance with the invention.

Referring to the drawings, and initially to FIGS. 1 to 4, there is shown a cut out system particularly for use in cut out of bonded vehicle glazing panels such as windscreens. The cut out system comprises a winder unit 1 and a wire dispenser unit 2.

The winder unit 1 comprises a pair of releasable suction cup mounts 10, 11 enabling the winder unit to be releasably secured to the windscreen. The suction cup mounts comprise a rigid plastics cup 12 and underlaying flexible rubber skirt membrane 13. Respective actuation/release levers 14 enable consistent suction to be applied and released. Such suction mounts are commonly employed in windscreen replacement and repair technology. The suction cup mounts 10, 11 are pivotably/tiltably mounted to the support bracket 15 of the winder unit to ensure that both mounts 10, 11 can locate in good engagement with the windscreen despite the curvature of the windscreen. The main body of the support bracket 15 carries a pair of underslung winding spools 4, 5 in side by side relationship. The spools are connected to axial winding shafts which are supported in bearings 16, 17 provided on the winder unit. The spools 4, 5 are driven axially rotationally either manually via a hand winder or by means of a mechanical actuator such as a motorised winding or winching tool.

Drive bosses 18 are provided with female sockets 19 (square bores) for receiving the male driving tool. Positioned outwardly of the winding spools are respective wire guide pulley wheels 8, 9 of low friction plastics material. The pulley wheels are mounted to be rotatable about respective rotational axes. The guide pulleys rotate as the cutting wire is drawn tangentially across the pulleys as will be described. The winder spools 4, 5 are held to rotate in one direction only (each in opposite senses) by respective ratchet mechanisms. Each mechanism includes ratchet override permitting prior tightened wire to be slackened, or unwound (reverse wound).

Figure 2:
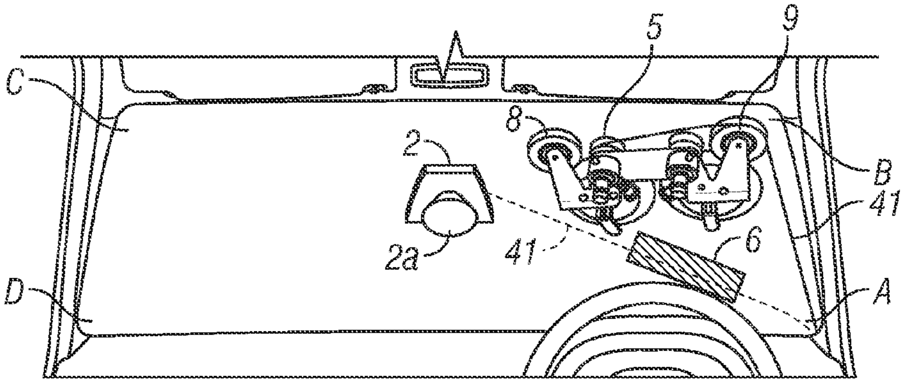
FIGS. 2 to 4 are schematic representations in sequence of a cut out technique.

The winder unit 1 is secured internally of the vehicle to the surface of the glazing panel 3 above the steering wheel as shown in FIG. 2. A wire store which also acts as a dispenser spool 2 is secured to the exterior surface of the glazing panel 3 and the wire 41 is wrapped around the external peripheral edge of the glazing panel staring at corner A and proceeding to corners B C and D. The wire subsequently passes adjacent the lowermost edge of the screen (from D toward A) where a free end is pulled through an aperture made in the PU bonding bead at the corner A, such that the free end of the wire can be attached to winder spool 5. An adhesive tape patch 6 is secured to the screen over the wire. The dispenser spool 2 includes a sucker mount 2*a* and an internal wire dispenser cartridge which is free to rotate in a housing so as to pay out wire from the dispenser spool as tension of a required magnitude is put upon the wire. The adhesive tape patch is used to give resistance to paying out of the wire from the spool. Other brake devices (typically resistance or friction providing devices may be used in addition to or as an alternative to the adhesive patch 6).

Removal is commenced by winding the spool 5 to move the cut from the corner A upwardly along the side edge and around corner B. During cutting, if excessive resistance occurs, from tough or large PU adhesive beads, the wire is able to spool off the dispenser spool 2 and slip and slice past the PU adhesive in what can be referred to as 'slip cutting'. The use of the spool dispenser mounted on the windscreen enables this 'slip cutting' to occur early in the cut out procedure and without pre cutting of the other free end of the wire 41. Once the cutting wire 40 has travelled around the corner B, the winder unit 1 is moved across the windscreen to the other side and re-secured to the windscreen in the configuration shown in FIG. 3. Prior to repositioning the unit 1, the ratchet of winder spool 5 is released to permit the wire to be wound out from the spool 5 as it is moved across the glazing panel to be repositioned. The ratchet is subsequently re-engaged and spool 5 once again operated to wind in the wire.

Figure 4:
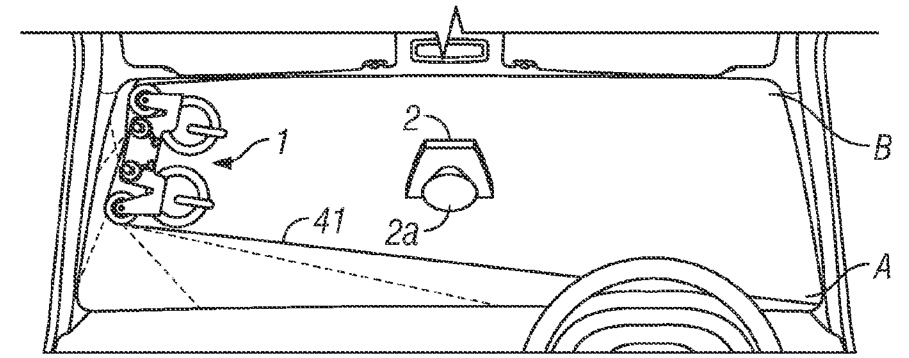

When the cut has almost been completed along the top edge, the winder unit is rotated through 90 degrees and re-secured as shown in FIG. 4. The cut is then progressed such that the cut position passes around the corner C. The adhesive tape 6 is next removed and enough wire is payed out from the dispenser spool 2 to reach and be wound on the winder spool. The measured length of wire is then cut from the dispenser spool and the cut free end is pulled into the vehicle either by prising out the already released corner of the windscreen to form a small gap, or insertion of the free wire end through the pre-formed hole in the PU bonding material at corner A. The free end of the wire 41 is then connected to the spool 4 (passing around pulley 8). The winder spool 4 is then operated to wind in the wire, in so doing cutting along the bottom edge.

The wire store/dispenser device 50 according to the present invention is shown in FIGS. 5 to 10 and provides advantages over the store/dispenser described above.

Figure 5:
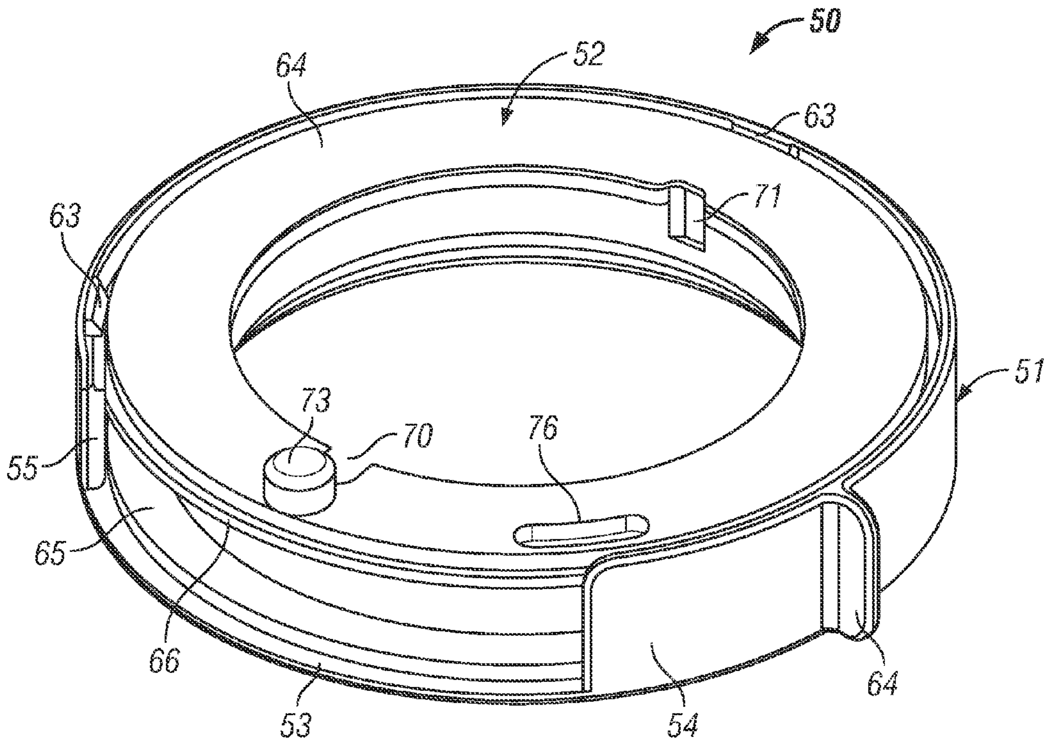
FIGS. 5 to 8 are schematic perspective views of a wire store device according to the invention.
Figure 6:
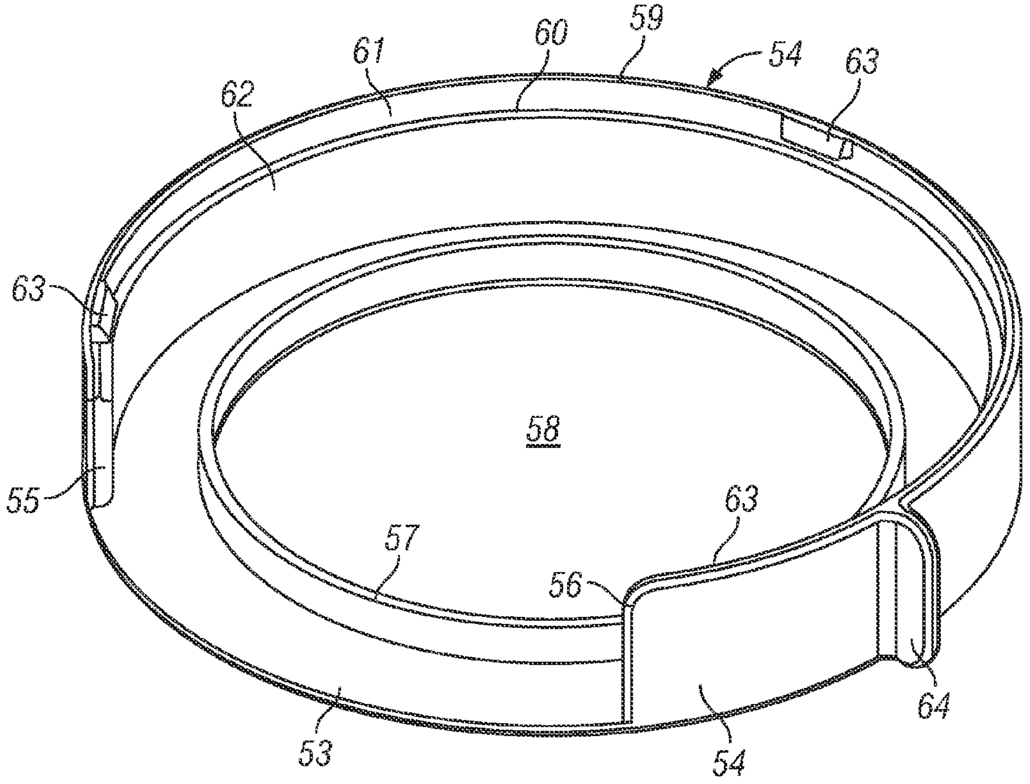

The store/dispenser device 50 as shown in FIG. 5 comprises an annular outer sleeve or housing 51 and which receives, seated therein, a spool body 52 upon which wire is wound. The spool body 52 and outer sleeve housing 51 are assembled to be rotatable relative to one another. The spool body is shown in isolation in FIG. 7. The sleeve housing 51 is shown most clearly in FIG. 6 and can be seen to have an annular base 53 and an upstanding outer wall 54 which extends most of the way around the periphery of the device 50 but is provide with terminal upright edges 55 56 defining a peripheral opening devoid of the wall 54. An inner circumferential upstanding lip 57 extends all around the central void 58 of the sleeve 51. Towards the upper rim 59 of the peripheral upstanding wall 54 there is a shoulder 60 between the upper radial inner surface 61 of the wall 54 and the lower radial inner surface 62 of the wall 54. The surface 61 is spaced radially outwardly of the surface 62. A series of clip projections 63 are spaced around the upper radial inner surface of the wall. A stop tab 64 is provided projecting radially outwardly from the outer surface of the wall 54.

Figure 7:
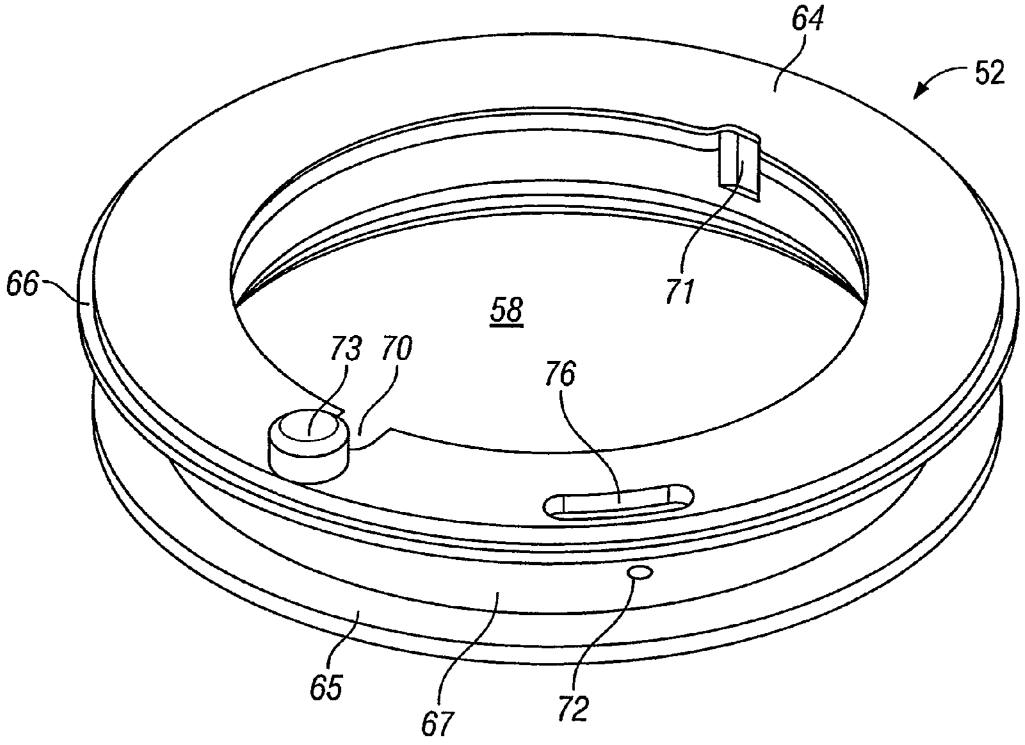
Figure 8:
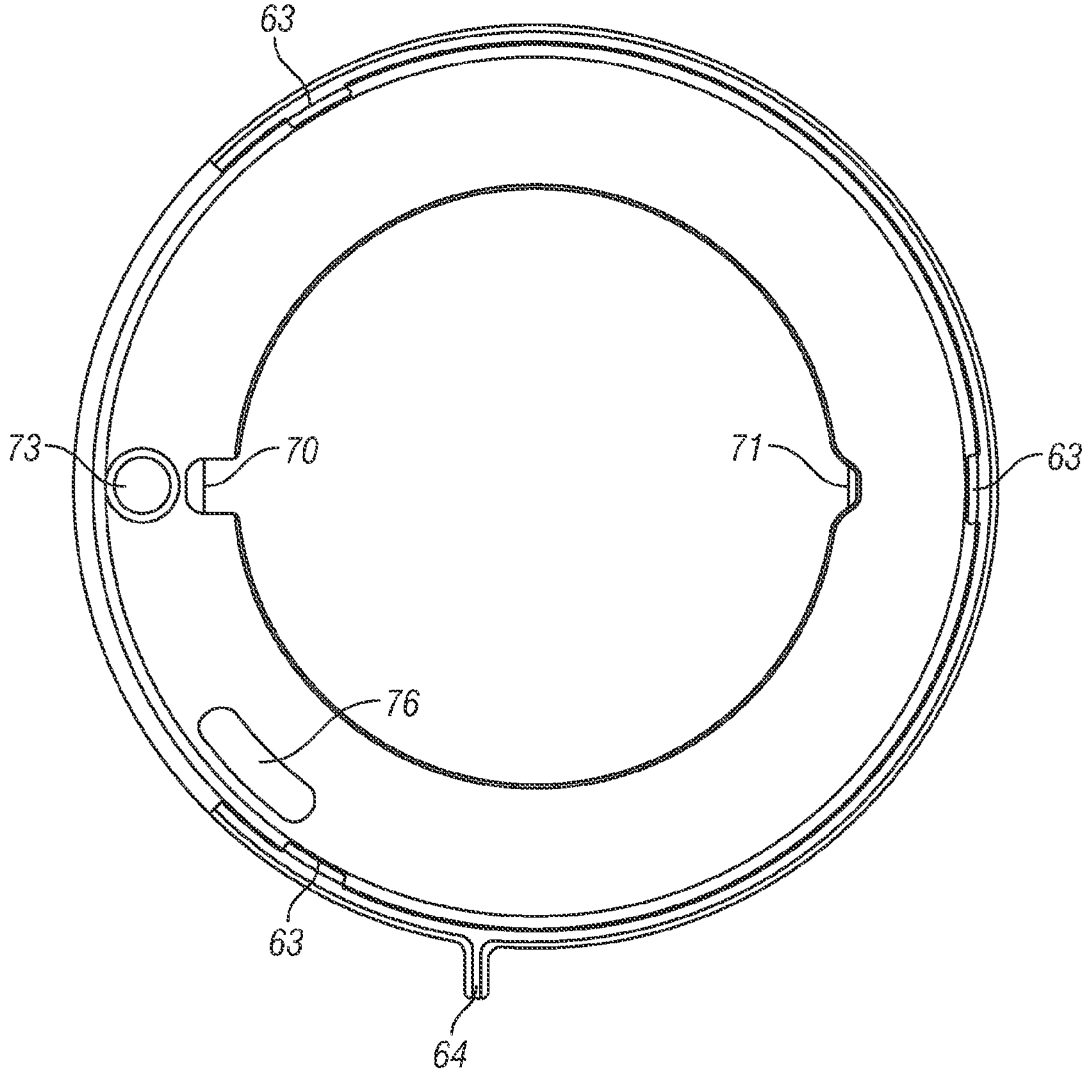

As shown in FIG. 7, the wire spool body 52 has an upper surface 64, an upper flange 66 just below the upper surface 64, the upper flange 66 extending radially outwardly. The item 52 also has a bottom flange 65 and a recessed annular wall 67 upon which the wire is wound. In order to assemble the device 50 the spool body 52 is pushed downwardly into the sleeve 51 until the bottom flange 65 rests on the base 53 of the sleeve 51. In so assembling the sleeve and the spool the clip projections deform and snap fit secure above the upper flange 66 of the spool 52. In this way the spool body 52 is held captive with respect to the sleeve but relative rotation is permitted between the two components. The wire spool 52 is provided with recesses 70 71 on opposed internal circumferential walls for locating on formations provided on a rotary capstan device 90 of a mount device 75 as will be described later. A winding projection 73 is provided on the upper surface 64 of the wire spool 52 enabling hand winding of the spool body 52 with respect to the sleeve 51. The recessed annular wall 67 is provided with a wire insertion aperture 72 angled to extend completely through the wall and permitting an end of the wire to be inserted and secured with respect to the spool body 52. The upper surface 64 is provided with a viewing aperture 76 to enable the insertion aperture to be viewed from above.

Figure 9:
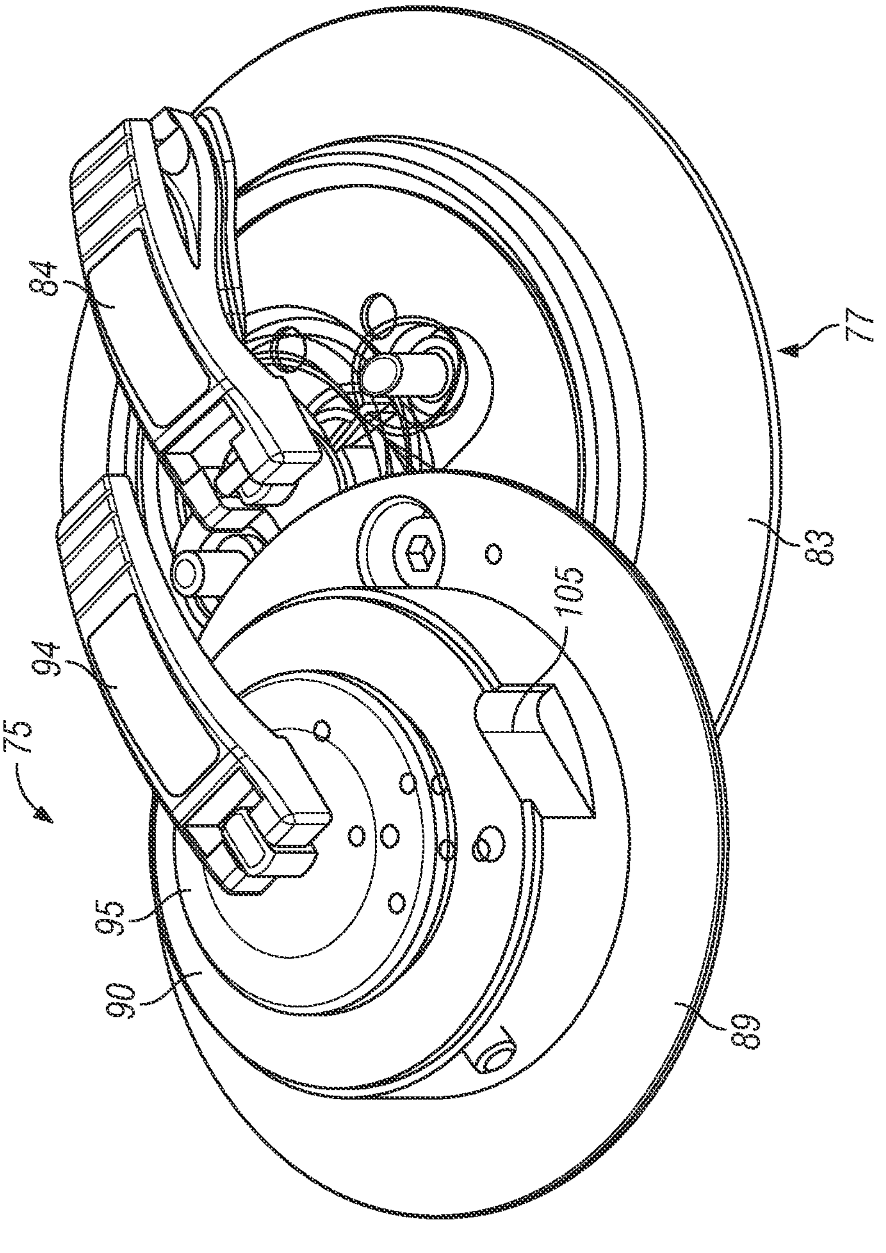
FIGS. 9 to 11 are schematic perspective, plan and sectional views respectively of a wire dispensing system in accordance with the invention.
Figure 10:
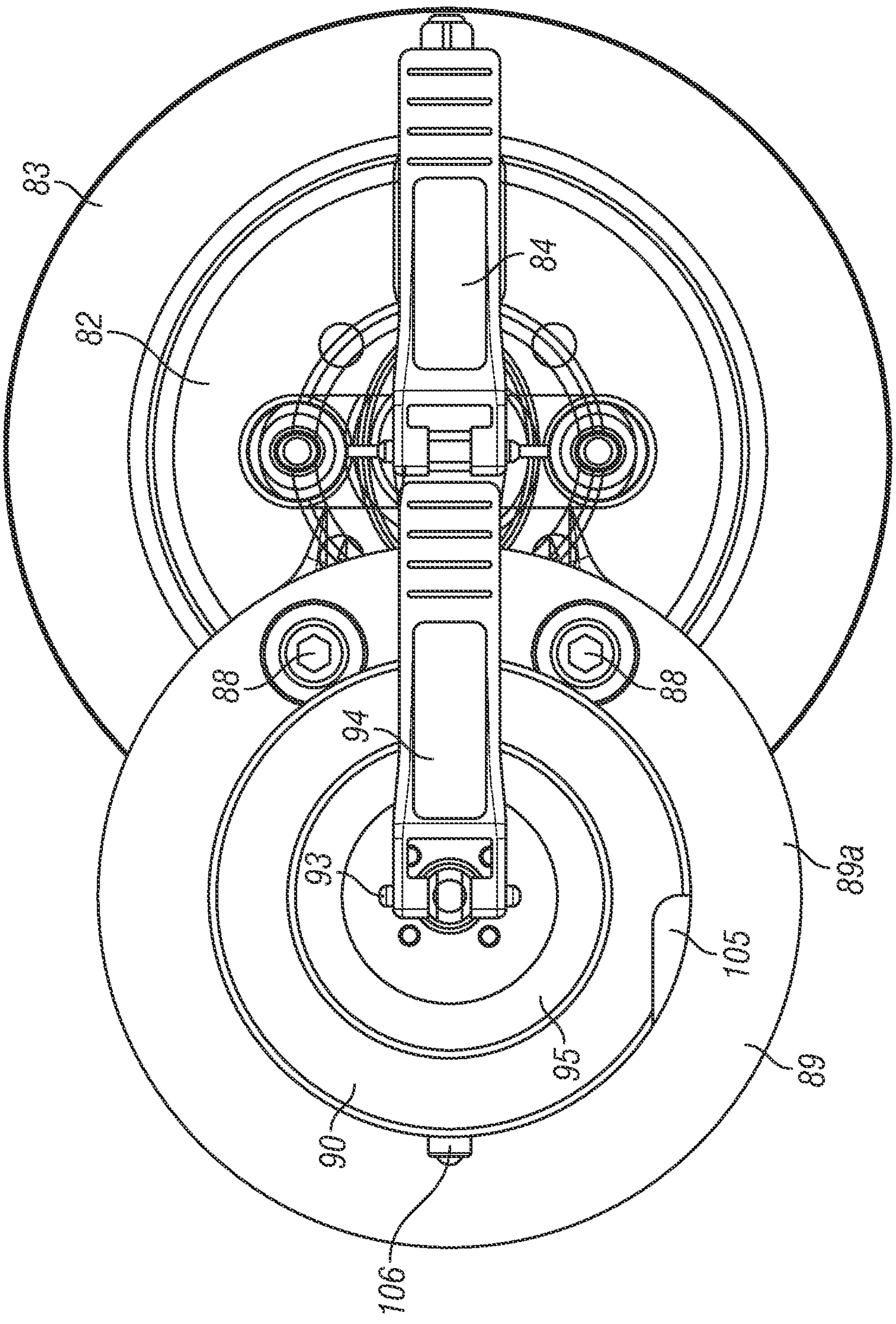
Figure 11:
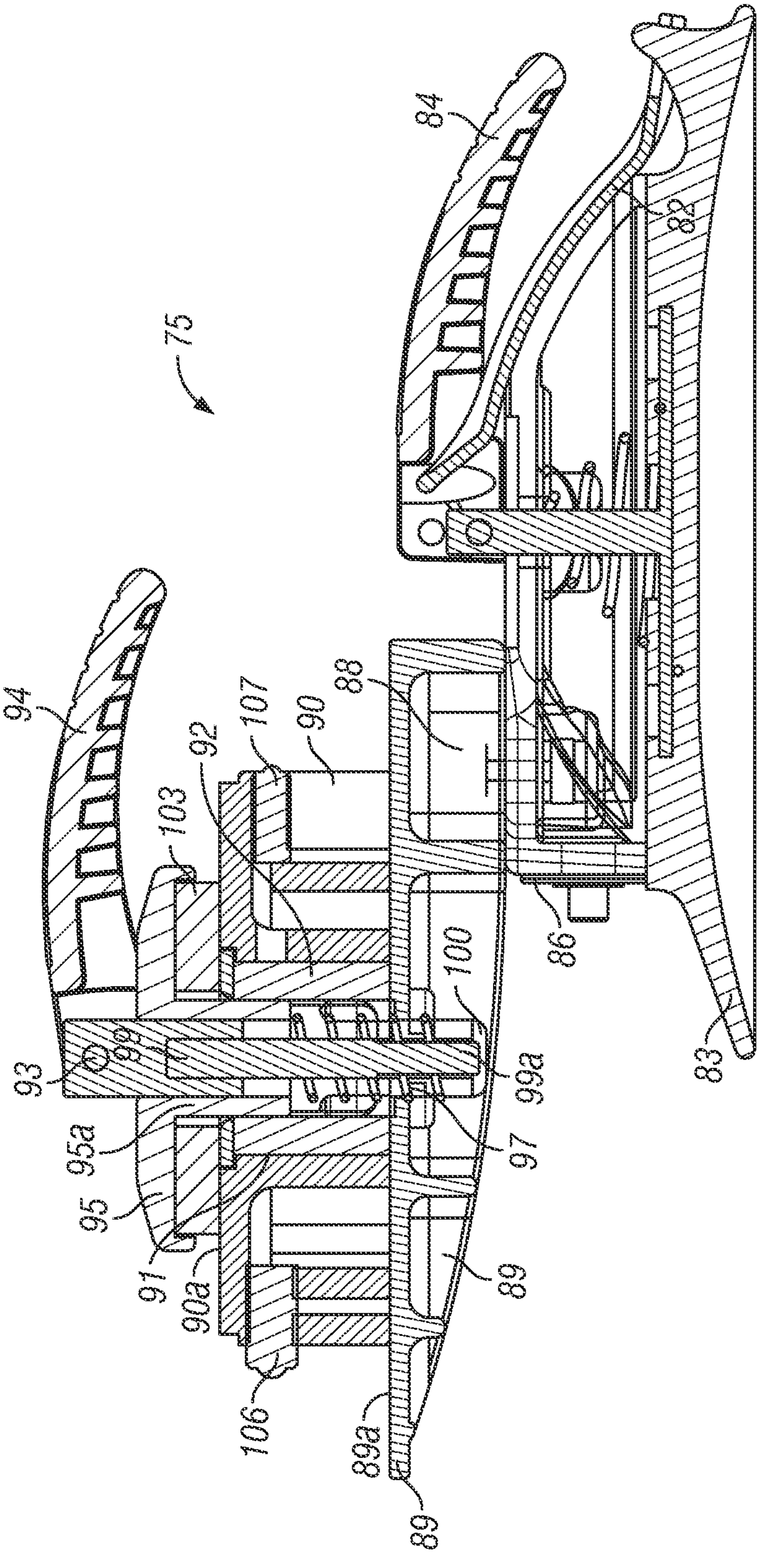
Figure 12A:
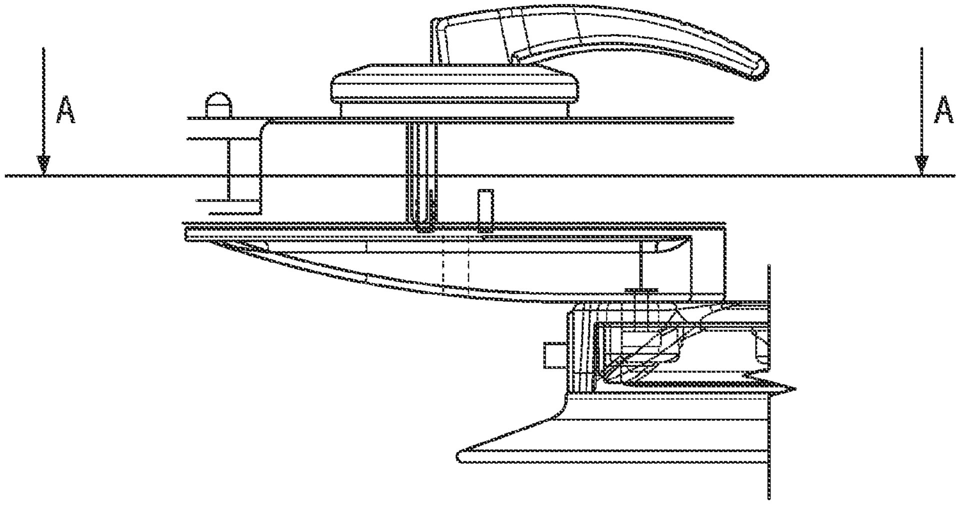
FIG. 12A is a schematic side view of the wire dispensing system of FIGS. 9 to 11.
Figure 12B:
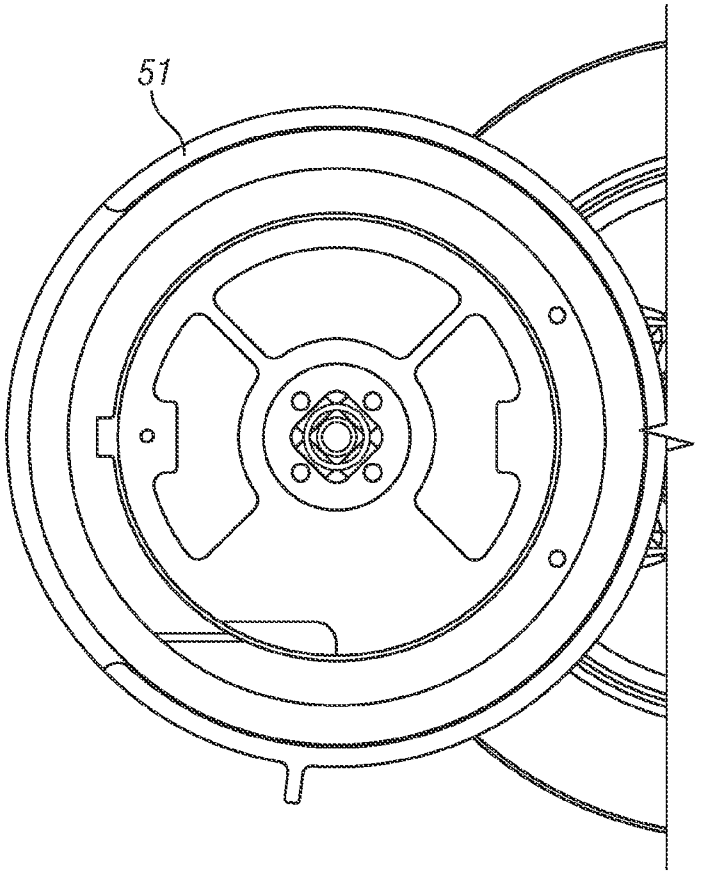
FIG. 12B is a plan sectional view of the wire dispensing system of FIG. 12A for the section A-A shown in FIG. 12A.
Figure 13:
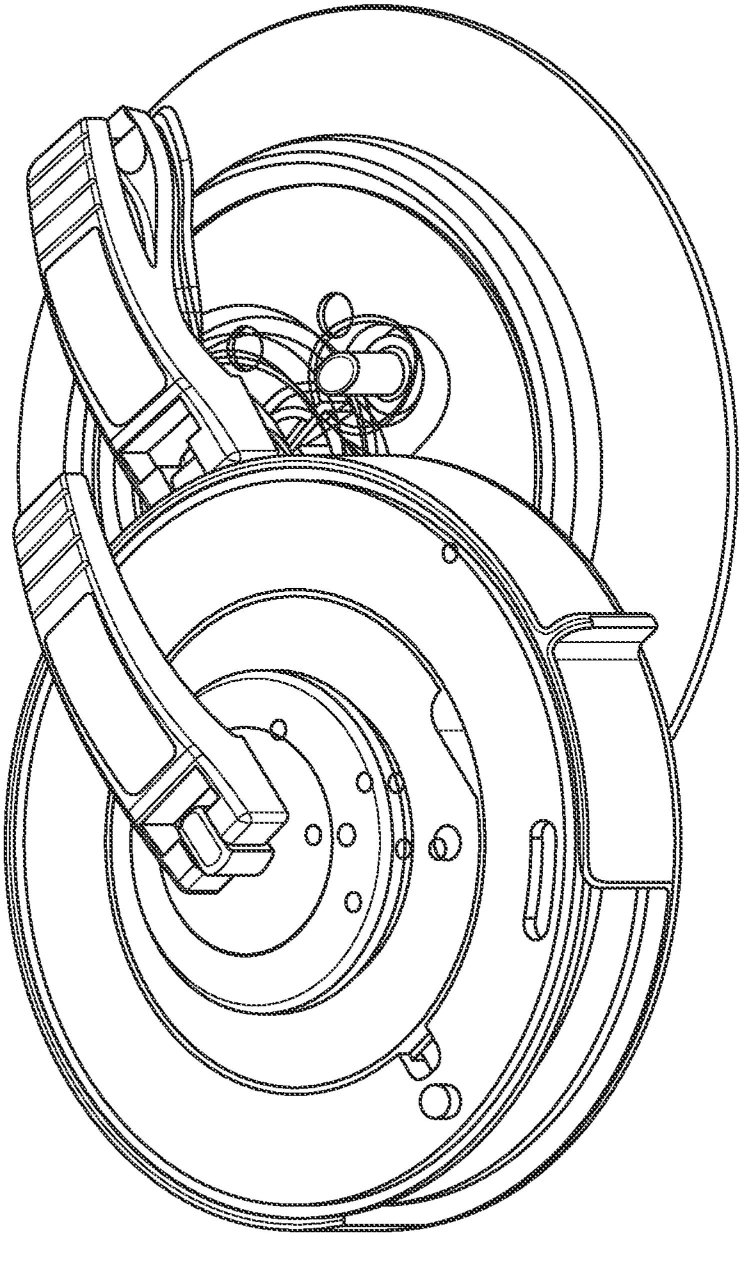
FIGS. 13 to 15 are schematic perspective, plan and sectional views respectively of a wire dispensing system in accordance with the invention, loaded with a wire store device according to the invention.
Figure 14:
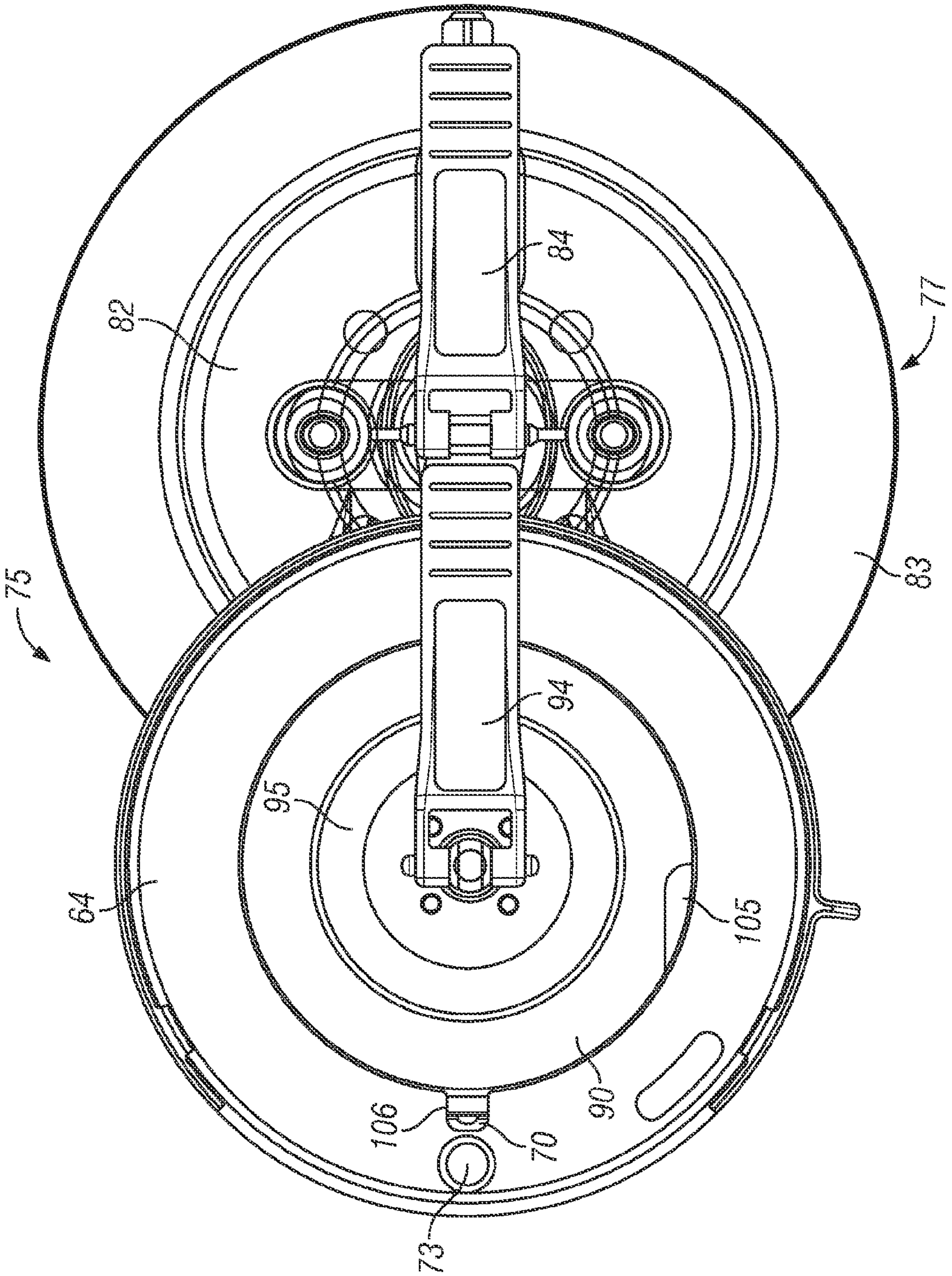
Figure 15:
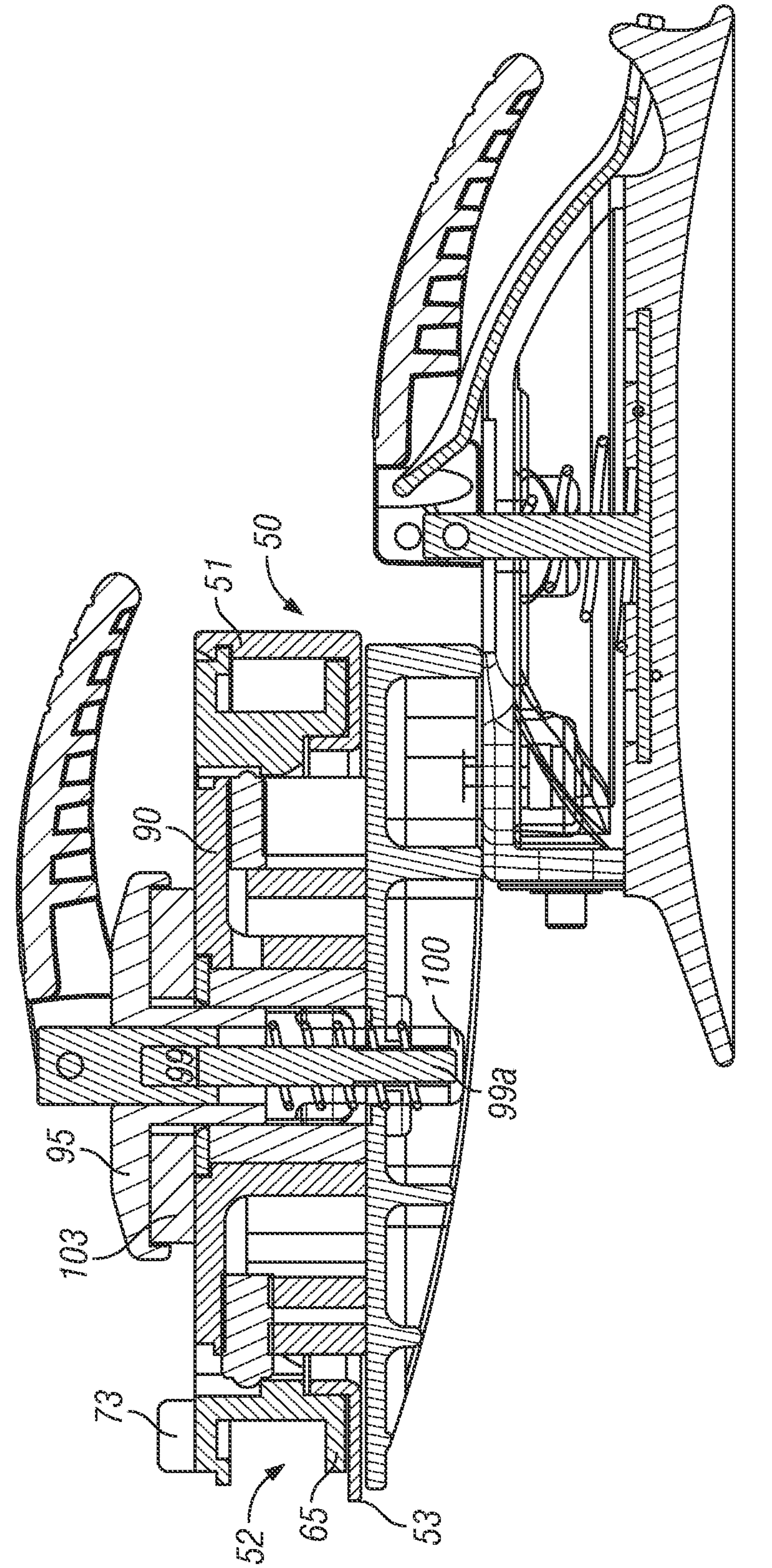

The mount device 75 to which the store/dispenser device 50 is mounted for dispensing the wire is best shown in FIGS. 9 to 11. The mount device comprises a releasable suction cup mounts 77 enabling the mount device to be releasably secured to the windscreen. The suction cup mounts comprise a rigid plastics cup 82 and underlaying flexible rubber skirt membrane 83. Actuation/release lever 84 enables consistent suction to be applied and released. As mentioned previously such suction mounts are commonly employed in windscreen replacement and repair technology. On the opposed side of the mount device 75 to the position occupied by the lever 84 when in the down or engaged position is a moulding 86 which received securing bolts 88 for a mounting platform 89 to which a rotary capstan 90 is mounted. The mounting platform 89 has a peripheral flange surface 89*a* extending outwardly from the rotary capstan 90 which is generally cylindrical in profile and rotationally mounted with respect to the platform 89 by means of a central aperture 91 which is mounted on the peripheral outer cylindrical surface of a stationary bush 92. An actuation/release lever 94 pivots about pin fixing 93 and in doing so cams against a reaction cap 95 which has a central stem tube 95*a* which is received in a central axial bore of the stationary bush 92. This cam action tends to force the reaction cap 95 downwardly. The bottom end of the stem tube 95*a* engages against a compression spring 97 to counteract the downward force and movement of the reaction cap 95 and stem tube 95*a*.

Effectively therefore the reaction cap is biased upwardly to an equilibrium position by the spring 97. When the lever is moved to its actuation position (the position shown in FIG. 11) the reaction cap 95 and stem tube 95*a* move downwardly and the spring becomes compressed. An axial rod 99 which is threaded at its lower end 99*a* is received in a threaded bore in a receiving boss 100 provided in platform 89. By rotating the axial rod 99 about its longitudinal axis (by the lever when orientated in its upright position), the reaction cap 95 and stem tube 95*a* move upwardly or downwardly with respect to the upper surface 90*a* of the rotary capstan 90. A conformable or compression disc 103 (such as felt disc) is mounted to the underside of the reaction cap 95.

When the lever is moved to its actuation position (the position shown in FIG. 11) the reaction cap 95 and stem tube 95*a* move downwardly and the spring becomes compressed. Depending upon the degree to which the reaction cap 95 and stem tube 95*a* have move upwardly or downwardly with respect to the upper surface 90*a* of the rotary capstan 90 as a result of the rotation of the axial rod 99 about its longitudinal axis, the compression disc 103 (which effectively acts as a brake disc) may either be clear of the upper surface 90*a* of the rotary capstan 90, or forced into engagement with the upper surface 90*a* of the rotary capstan 90, thereby acting as a brake to rotation of the capstan 90 on the platform 89. In this way, the dispensing device includes a braking mechanism, which is readily adjustable with respect to the braking force applying during paying out of the wire. The degree of braking achieved will depend upon the degree to which the axial rod has been rotated in the clockwise or counter-clockwise sense. At one extreme there may be no frictional engagement between the compression disc 103 and the upper surface 90*a* of the rotary capstan 90, in which case the rotary capstan can rotate freely. At the other extreme there will be maximum engagement between the compression disc 103 and the upper surface 90*a* of the rotary capstan 90, in which case the rotary capstan may be prevented from rotating at all. In between these two extremes the torque required to rotate the capstan will vary depending upon the position of the axial rod 99. As a result it is possible to finely adjust the braking acting on the capstan.

The rotary capstan 75 is provided on opposed circumferential wall portions, with detents 106 107 which are arranged to match up and engage in the recesses 70 71 on opposed internal circumferential walls of the wire spool 52 as the wire store 50 is docked downwardly to rest on the platform flange 89*a*, settling snugly about the outer surface of the capstan. The engagement recesses 70 71 are shaped to cooperate with the detents 106 107 such that once engaged the spool 52 is effectively rotationally locked with respect to the capstan 75 such that the capstan and the spool 52 rotate in unison (unless rotation is effectively inhibited by the braking mechanism earlier described). It should be noted that the housing 51 does not rotate in unison with the capstan and the spool body 52 ensuring that the dispensing gap between the edges 55 56 of the wall 54 remains in position.

However, the engagement between the detents 106 107 and the recesses is such that the store device 50 can be lifted upwardly clear of the capstan 90, from the docked position with relatively little manual force applied. To this end the engagement formations (either the detents 106 107 or the recesses 70 71) are preferably linear formations extending upwardly/downwardly with respect to the circumferential walls of the capstan 90 and the spool 52. The recesses 70 71 preferably comprise slots or channels. The capstan 90 also includes a recess 105 for accommodating the end portion of the wire that extends through the wire aperture 72 in the store dispenser device 50.

Figure 3:
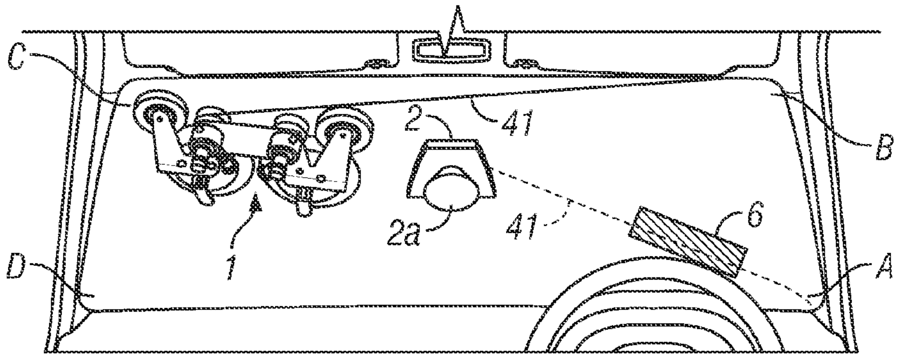

When a store/dispenser device 50 is loaded with wire and secured to the mount 75, wire can be drawn from the store/dispenser device 50 and used in a similar way to the wire store dispenser device 2 as described in relation to FIGS. 2 to 4.

Several advantages are however realised by the invention over the store dispenser device as described in relation to FIGS. 2 to 4.

Firstly, the wire store 50 can be easily and conveniently demounted from the mount 75. This enables the store, with the wire still wound on the spool body 52, to be passed from one side of the windscreen to the other by prising out the already released corner of the windscreen to form a small gap and passing the spool through the gap. The required length may then be payed out from the spool 52 before being cut.

Secondly, the adjustable braking mechanism ensures that the cutting out process can be tailored to ensure that wire dispensing is accurately controlled. For example when setting out the wire around the periphery of the windscreen there are instances at which it is desirable to prevent any further wire from being pulled out from the store/dispenser. At such instances maximum brake force can be applied. At other instances it is desirable to permit the wire to be dispensed freely and therefore the brake system can be completely released. At other instances during the procedure, for example when slip cutting, some torque resistance is required and the present system enables the torque resistance applied for slip cutting to be readily adjusted and set to the level desired by the operator.

The provision of the store/dispenser device 50 having an annular outer sleeve 51 and which receives, seated therein, a relatively rotatable spool 52 upon which wire is wound is also advantageous. This provides for dispensing and or loading of the store device 50 in a controlled manner and prevents so called 'birds nesting' occurring. 'Birds nesting' occurs when a poorly constrained wound coil of wire springs of a spool in an uncontrolled manner thereafter becoming tangled, possibly kinked and difficult to use.

The present invention provides the benefits of wire cutting systems without over complex system apparatus arrangements or the need to re configure the apparatus significantly following initial set up. The technique can be used by operators of relatively little experience or physical strength following an initial set up routine of minimal complexity.

The invention claimed is:

1. A dispensing system for dispensing an elongate cutting element to be used in conjunction with a glazing panel, the system comprising;

a store device configured to store and dispense the cutting element; and a mounting device configured to selectively mount to the glazing panel, the mounting device including a docking station that operably interfaces to the store device;

wherein both the docking station and the store device are configured to removably engage with one another in a docked configuration and to selectively disengage from one another in response to manual lifting forces applied to the store device;

wherein the docking station comprises a rotatable structure;

wherein the store device comprises a spool around which the cutting element is wound, wherein the spool includes an internal wall that defines a central opening configured to receive the rotatable structure of the docking station; and wherein the internal wall of the spool of the store device and the rotatable structure of the docking station include respective complementary engaging structures that are arranged to removably engage one another in the docked configuration and to selectively disengage from one another in response to the manual lifting forces applied to the store device.

2. A dispensing system according to claim 1, wherein:

the docking station is provided with rotary means operable to pay out the cutting element from the store device.

3. A dispensing system according to claim 2, wherein:

the rotary means is controllable to adjust a torque applied to the rotary means that is required to operate the rotary means.

4. A dispensing system according to claim 3, further comprising:

adjustable brake means operable to adjust the torque applied to the rotary means that is required to operate the rotary means.

5. A dispensing system according to claim 4, wherein:

the adjustable brake means comprises a friction brake that has a first configuration that increases its braking effect and a second configuration that reduces it braking effect.

6. A dispensing system according to claim 2, wherein:

the rotary means comprises a rotary device that is coupled to store device in the docked configuration of the docking station and the store device.

7. A dispensing system according to claim 6, wherein:

the store device comprises a spool around which the cutting element is wound, wherein the spool is coupled to the rotary device for rotation with the rotary device in the docked configuration of the docking station and the store device.

8. A dispensing system according to claim 6, wherein:

the store device has a central aperture that is configured to receive the rotary device in the docked configuration of the docking station and the store device.

9. A dispensing system according to claim 6, further comprising:

adjustable brake means engaging with the rotary device and operable to adjust a torque applied to the rotary device that is required to operate the rotary device.

10. A dispensing system according to claim 9, wherein:

the adjustable brake means is operated by a cam and lever.

11. A dispensing system according to claim 1, wherein:

the engaging structures are configured such that the store device and the docking station rotate together in union in the docked configuration of the docking station and the store device.

12. A dispensing system according to claim 1, wherein:

the mounting device comprises a suction mount configured to selectively mount on the glazing panel under user control.

13. A dispensing system according to claim 1, wherein:

the cutting element comprises a wire.

14. A dispensing system according to claim 1, wherein:

the docking station and the store device are configured to removably engage with one another in the docked configuration in response to manually pushing the store device toward the docking station.

15. A dispensing system according to claim 1, wherein:

the complementary engaging structures comprise at least one recess disposed on the internal wall of the spool of the store device that removably engages a corresponding detent disposed on the rotatable structure of the docking station.

16. A dispensing system according to claim 1, wherein: the store device further includes a housing that is detachably secured to the spool of the store device.

17. A dispensing system according to claim 16, wherein: the housing and the spool of the store device are provided with respective complementary engaging structures that are arranged to removably engage one another.

18. A dispensing system according to claim 17, wherein: the housing has a peripheral wall that is configured to receive the spool and partially surround the spool; and the complementary engaging structures comprise at least one deformable projection disposed on the peripheral wall of the housing that removably engages an annular flange disposed on the spool.

19. A dispensing system according to claim 18, wherein: the peripheral wall of the housing has a top rim; and the at least one deformable projection is disposed adjacent said top rim.

* * * * *